United States Patent [19]

Lindström

[11] 4,008,099
[45] Feb. 15, 1977

[54] CHEMOELECTRIC BATTERY
[76] Inventor: Olle Birger Lindström, Lorensviksv. 14, 183 63 Taby, Sweden
[22] Filed: Mar. 11, 1976
[21] Appl. No.: 666,013
[30] Foreign Application Priority Data
  Mar. 14, 1975 Sweden ............................ 75028605
[52] U.S. Cl. .................................. 429/59; 429/82; 429/210
[51] Int. Cl.² ......................................... H01M 1/00
[58] Field of Search ............... 136/10, 3, 179, 180, 136/177, 163

[56] References Cited
UNITED STATES PATENTS

| | | | |
|---|---|---|---|
| 3,003,013 | 10/1961 | Duddy | 136/10 X |
| 3,488,220 | 1/1970 | Lyall et al. | 136/3 X |
| 3,728,158 | 4/1973 | Poe et al. | 136/10 |

*Primary Examiner*—Anthony Skapars
*Attorney, Agent, or Firm*—Burns, Doane, Swecker & Mathis

[57] ABSTRACT

A battery includes a plurality of bipolar electrodes which include a wall, positive electrode material disposed on one side of the wall, and negative electrode material disposed on another side of the wall. Electrolyte chambers separate the electrodes. At the top of each electrolyte chamber a gas lock is provided. The gas locks are fluidly interconnected by fluid conduits. The conduits communicate with the gas locks at a level disposed below the top of the electrolyte chamber. Pressure build-ups in one electrolyte chamber can thus be distributed to the gas locks of other electrolyte chambers. Hydrophobic plugs can be disposed within the conduits which permit the passage of gas, but restrict the passage of electrolyte.

18 Claims, 10 Drawing Figures

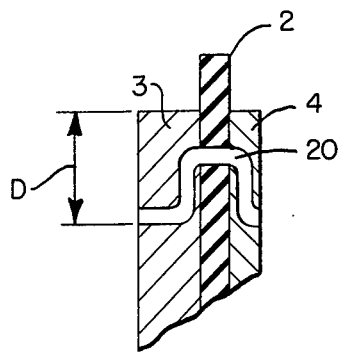
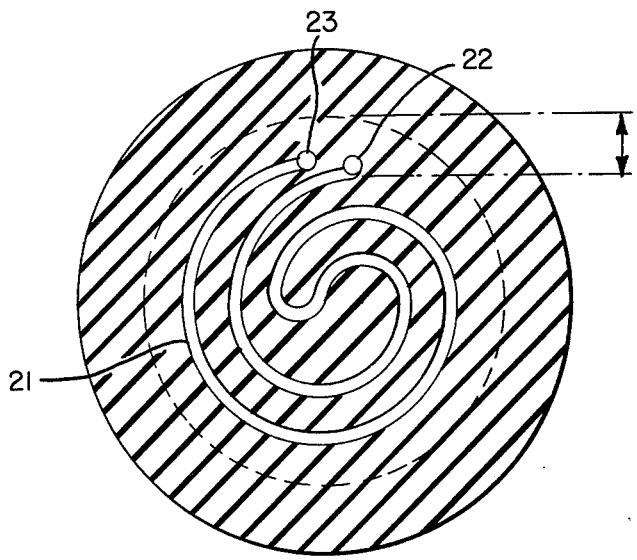
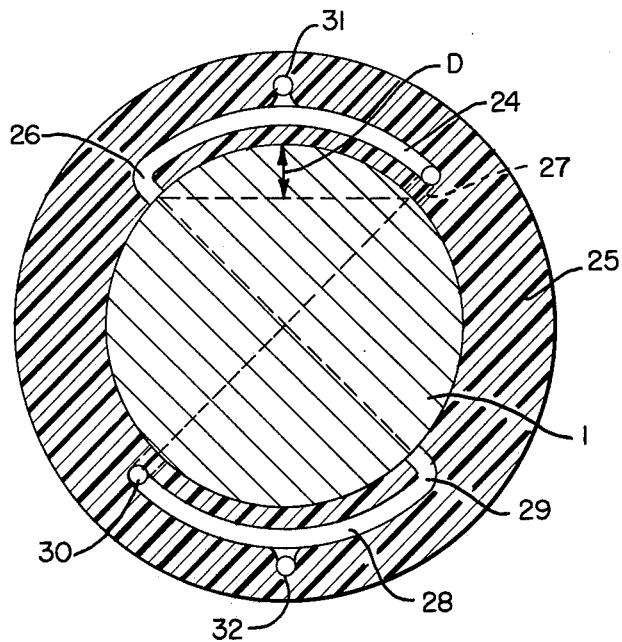
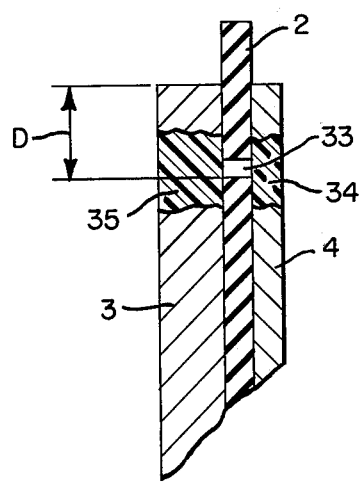
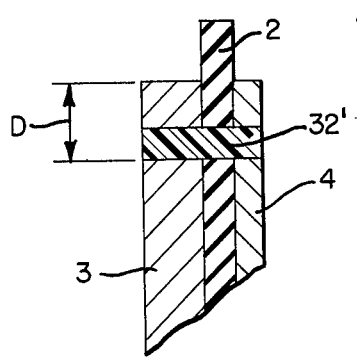

CHEMOELECTRIC BATTERY

BACKGROUND AND OBJECTS OF THE INVENTION

This invention relates to electrochemical batteries.

There are tough requirements on electrochemical power sources for tractionary applications like electric trucks and cars. The power and energy density should be high, and the system must be simple and reliable and easy to service. Furthermore, first cost must be low and the cycle life in tough and varying operation, should be at least so long that the capital costs turn out to be about the same level as the operating costs, which should be dominated by the cost for the electrical energy. The efficiency in the energy conversion will also be of great importance for the kind of power sources which satisfy the economic requirements indicated above.

The lead acid battery is the power source which today is close to satisfying the requirements mentioned above, but it is nevertheless unsatisfactory because of too low energy density. In practice, it is possible to extract 20 W/kg of a tractionary lead acid battery during 1 hour which gives an action distance of but 50–100 kilometers for an electric car cruising at about 50 km/h or somewhat above.

A lot of work is, therefore, put into the development of power sources with a higher energy density and satisfactory power density for tractionary applications. Efforts have been made to reach high enough energy densities that the electric vehicle can be capable of the same performance as a related version with an internal combustion engine. The metal air batteries, the high temperature batteries and the fuel cells are examples of such advanced power sources. These systems are, however, complicated and it has not yet been demonstrated that these systems can satisfy all other requirements which must be put on the tractionary battery, for instance in electric cars. In fact, a lot would be gained with a battery exhibiting the many good properties of the lead acid battery but with doubled energy density, which in the high power region should correspond to the level 40 W/kg during a 2 hour discharge or slightly above that. Such a battery would give twice the action distance for today's electric vehicles during otherwise unchanged conditions. Alternatively, one could maintain the performance of the present electric vehicle but reduce the battery weight with about 50% which would allow much more pay load, of great importance for the electric distribution vehicles. The present invention refers to a battery with this kind of performance and which in other respects meets the requirements put on a power source for general tractionary application. This good result is obtained by a combination of cooperating design features and a special design of the electrolyte system which produces a number of important advantages despite the fact that this special feature is in conflict with present practices in the battery technology.

One object of the present invention is thus to provide a battery with at least twice the energy density of the tractionary lead acid batteries presently use in electric cars.

Another object is to provide a battery which exhibits a much better cycle life than deeply tractionary lead acid batteries.

A further object is to provide a battery which uses raw materials which are available in large quantities so that restricted availability of raw materials should not stop the application on a very large scale.

Yet another object is to design the battery in such a manner that the used materials can be easily recovered in order to keep the user's cost down.

Still another purpose is to provide a battery which can take tough treatment with no risk for fire or other hazards.

An additional object is to provide a battery which is sealed against the environment and which requires a minimum of maintenance and service.

One further object is to provide a battery which can be easily manufactured on a large scale and be built in a modular shape for easy assembly and simple adjustment to different kinds of vehicles or other applications.

One additional object is to provide a method for eliminating gas developed in a battery.

BRIEF DESCRIPTION OF THE INVENTION

The present invention achieves all these different objects in a surprisingly simple manner, depending on the special combination of design features, due to the electrolyte system which is a particularly characteristic feature of the invention. Power sources according to the invention have bipolar electrodes. These electrodes belong preferably to the class of alkaline batteries where the negative side of the bipolar electrode contains preferably iron, cadmium, or zinc in such a configuration according to the state of the art that a good cycle life is maintained; whereas the positive side of the bipolar electrode contains preferably hydroxides of nickel, iron or cobalt and/or oxides of lead and silver or mixtures thereof, preferably arranged in a supporting skeleton of the metals nickel, cobalt or iron or other suitable supporting structures with a good electronic conductivity and a sufficient stability in the environment in question. The bipolar electrodes are preferably arranged after each other in a pile, that is in so-called filter press configuration with inter-positioned electrolyte spaces for the water-contained electrolyte. The electrolyte space can contain supporting pins or other separating means, alternatively separators of the kind which are being used in the alkaline accumulators. (See Falk and Salkind "Alkaline Storage Batteries" for a general description of the state of the art in the field of alkaline batteries, particularly the pages 42–275).

The bipolar electrodes can be framed in frames or arranged in other ways in separating organs so as to generate the electrolyte spaces. The bipolar electrodes can be of different shapes, for instance elliptical, circular, rectangular, square or shaped in other ways. The characteristic feature for the invention is that the pile with the bipolar electrodes are arranged so that the electrolyte spaces under normal operating conditions do not communicate with the environment so that gas and/or electrolyte cannot be let out to the surroundings. A particularly useful embodiment is to dispose the pile in an outer vessel with connections for pole bolts, means for filling with electrolyte, safety means etc. Making the pile circular in cross-section is frequently particularly advantageous since the outer vessel can then be shaped as a cylinder.

The particularly characteristic feature for the invention is that at least one fluid connection is arranged between the upper parts of the electrolyte spaces in the pile with bipolar electrodes. These connections are on such a level that during the normal operating position of the pile the connections are below the highest level in the electrolyte spaces so as to produce a gas lock, or gas space, between the highest level in the electrolyte spaces and the level of the connection. Several connections can, of course, be arranged on about the same level, as well as further connections on lower levels than the lowest level of the gas lock, which latter connections in this case primarily would serve as transporting means for electrolyte between the electrolyte spaces. Every bipolar electrode in the battery pile is thus furnished with at least one fluid connection through the electrode so that all the electrolyte spaces thereby are in fluid connection with each other.

It is, however, not required, that the connections are so arranged that every electrolyte space will communicate directly with the nearest electrolyte spaces. The connection between one electrolyte space and its nearest electrolyte spaces can also be established in an indirect manner by having the first electrolyte space communicate with electrolyte spaces farther away, which then in their turn communicate with the electrolyte spaces which are nearest the first-mentioned electrolyte space. Such connections can be shaped as tubes which pass through the intermediate electrolyte spaces with no connection with them. This gives a complicated system of channels and this involvement is not recommended.

Connections are also arranged between the electrolyte spaces in the pile and the surroundings in the form of connections for electrolyte filling and means for gas exhaust during electrolyte filling. These connections are, however, blockes or closed during normal operation. It is practical to arrange the connection for electrolyte filling at one of the extreme electrolyte spaces of the pile and the connection for gas vent at the other extreme electrolyte space. During normal operation with electrode materials which are used in alkaline cells the changes of the electrolyte, mainly concentration and volume changes, are comparatively small. During discharge, as many hydroxide ions are bonded in the anode material as are set free of the cathode material and vice versa during charge.

The electrolyte phase is, however, not completely volume invariant. Volume changes that might occur, which also could be caused by temperature changes, can primarily be accommodated by the gas phase in the gas lock of every electrolyte space. With large batteries and/or large volume changes of the electrolyte it can also be useful to dispose special expansion spaces within or in connection with the battery vessel.

Gas can also be developed in the electrolyte space particularly during over-charge but also by so-called cell reversal within individual cells, or by self discharge. This gas generation is frequently localized to one or a few electrolyte spaces in the pile and could lead to quite large pressure surges therein, with accompanying mechanical damage to the battery. The invention eliminates this risk and inconvenience in a surprisingly effective manner thanks to two cooperating effects by the connections which are a particularly characteristic feature of the invention. In this connection, it is known that electrode materials, particularly those which are used in the alkaline battery, possess the property to react chemically with the gases which are developed in the electrolyte space, that is, hydrogen and oxygen. Oxygen reacts easily with the negative material; hydrogen reacts, though more slowly, with the positive electrode material. The so-called sealed alkaline cells contain an excess of negative material which reacts with the oxygen, while at the same time hydrogen development is minimized. Gas which is generated in the electrolyte space is collected in a gas lock and will thus react there with the electrode materials or with particularly active electrode materials and/or recombination catalysts which are disposed in the gas lock.

When there is an excessive gas development in a single electrolyte space, the gas will, however, find its way to gas locks in other electrolyte spaces via the fluid connections. The immediate effect of this is pressure reduction and pressure equalization. The important effect is, however, that all electrolyte spaces, that is, the active material in each gas lock, will help to eliminate the gas which has been generated in one single electrolyte space. The particularly characteristic feature of the invention thus improves battery reliability dramatically and makes it possible to utilize the other features of the invention practicably in tough tractionary applications. This particularly characteristic feature of the invention may be considered contrary to earlier design philosophy concerning batteries with bipolar electrodes.

DRAWINGS

Preferred embodiments of the invention will be discussed below in connection with the accompanying drawings in which, FIG. 1 is a longitudinal sectional view through the center of a battery depicting fluid connector conduits extending between gas locks according to the invention;

FIG. 2 is a longitudinal sectional view through a top portion of a battery cell depicting a modified form of fluid connector according to the present invention;

FIG. 3 is a cross-section taken through a separator wall of a battery cell depicting still another modified form of fluid connector arrangement;

FIG. 4 is a cross-section taken through a battery cell, including the electrode frame, depicting a further embodiment of fluid connector system arranged in the electrode frame;

FIG. 5 is a longitudinal sectional view through a top portion of a battery cell depicting a further embodiment of the invention wherein a hydrophobic plug is disposed in the fluid conduit;

FIG. 6 is a view similar to FIG. 5 but showing an alternate arrangement where hydrophobic material is disposed within the electrodes;

DETAILED DESCRIPTION

Figure 1:
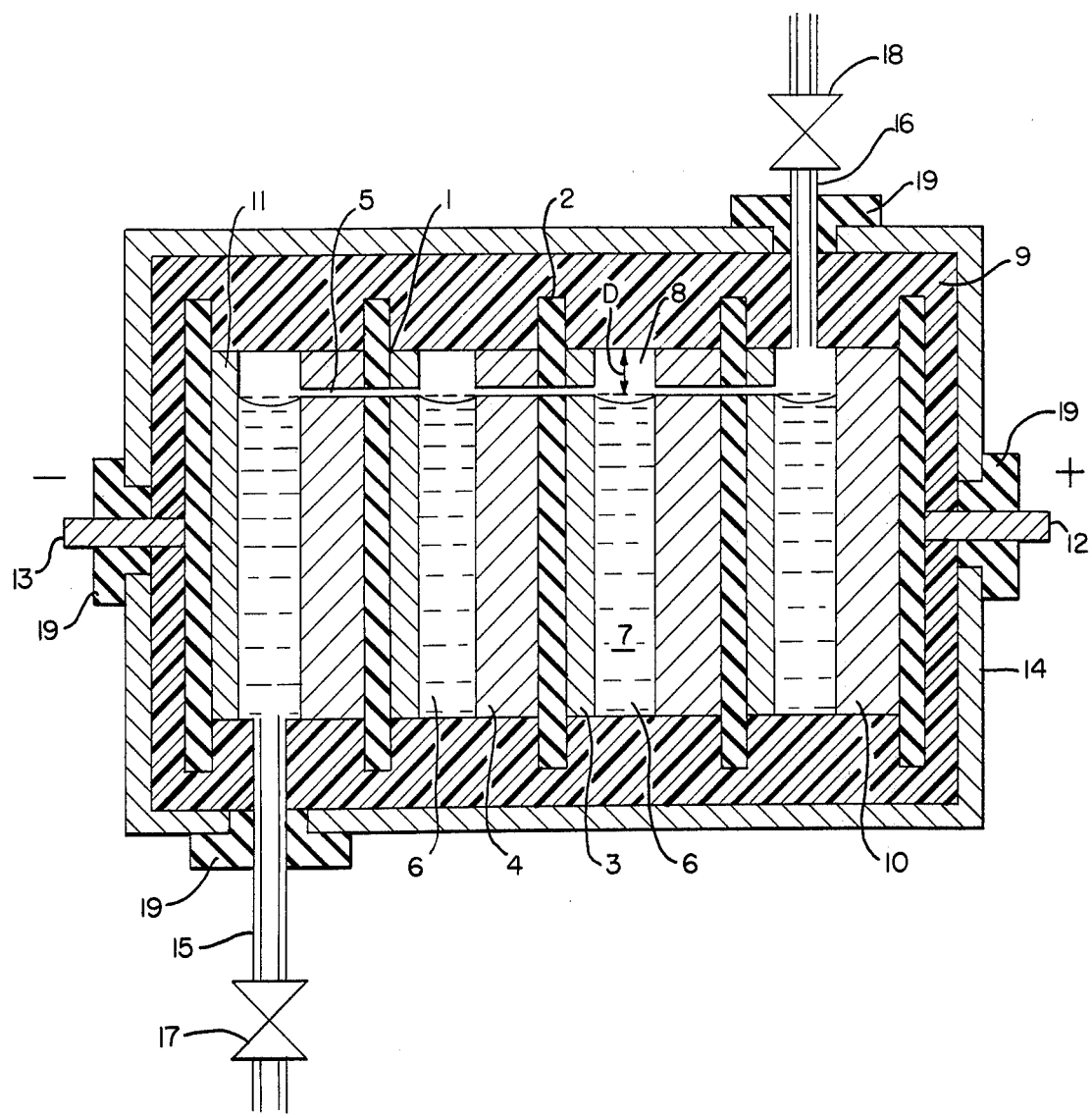

The principles of the invention shall now be described further with reference to FIG. 1. This figure shows in principle the disposition of the characteristic elements of the invention. The bipolar electrodes 1 each contain a separating wall 2 which is at least pointwise electronically conducting but impermeable for the electrolyte, except for the special connections as will be discussed. That is, the wall itself may be electronically insulative but must then contain wires which connect the positive electrode material of the associated electrode to the positive electrode materials of other electrodes (and which connect the negative electrode material of the associated electrode to the negative electrode material of the other electrodes). The positive electrode material is arranged on one side 4 and the negative electrode material on the other side 3 of each separating wall. The fluid connection which is characteristic for the invention is designated 5 and is in this example arranged as a conduit between the electrode and the neighboring electrolyte spaces 6, separated by the bipolar electrode.

The electrolyte space also contains a mass of electrolyte 7 and may also contain separating means such as distance elements, etc., to prevent short-circuits. The gas lock 8 which is characteristic of the invention is located in the electrolyte space or chamber 6 between its top and the level of the connection 5 In FIG. 1 the conduit 5 is depicted as communicating with the gas lock at a level just above the electrolyte. The electrolyte space may also contain a separator which can occupy the space entirely, except for the pores of the separator itself. The separator may also be partially gas-filled in the part which is situated in the gas lock and electrolyte-filled in its lower part, as will be discussed later in connection with FIG. 7.

The pile of electrodes is arranged in an isolating envelope 9. This could be a continuous body, for instance of cured resin, or could be a body which is formed by frames at the periphery of each porous bipolar electrode, which are put together as described in the Swedish Pat. No. 217,054. The pile has monopolar electrodes with positive material 10 and negative material 11 in its two ends. The two end electrodes are joined to the pole bolts 12 and 13. The isolating envelope 9 can advantageously be disposed in a vessel 14, for instance made of high pressure vessel steel. The pole bolts are isolated from the vessel by means of isolating connections 19. The connections for electrolyte filling 15 and venting 16, which are equipped with shut-off valves 17 respectively 18, are isolated from the vessel by the connections 19. The isolating connection 19 is similar to that discussed later in relation to isolating connections.

Gases produced during battery charging contact the electrode materials located in the gas lock. Drying out of this electrode material, which might lead to a too violent reaction, is prevented thanks to the nearness of the electrolyte material. These electrode materials are porous and thus have a good suction power since they contain fine pores, frequently smaller than 100 mm. Also those parts of the electrodes which are situated in the gas lock will, therefore, contribute to the discharge current and become regenerated during charging. The distance between the highest level of the electrode and the level of the connection 5 should, however, be smaller than 10 cm to eliminate the risk of the electrode drying out. In practice, it is frequently sufficient for a distance between 0.5 and 5.0 cm to provide for sufficient gas elimination. The distance should not be made too small since then the gas locks will be too small and the pressure surge too big. (This distance D has been marked with a measuring arrows in the figures).

A significant advantage of the gas locks is that they interconnect the electrolyte chambers 6 so as to provide larger space for accommodating changes in electrolyte volume in one or more of the electrolyte chambers. Also, overpressurization by surges in gas pressure in one or more of the electrolyte chambers is prevented since gas pressure can be exhausted to others of the electrolyte chambers.

The part of the electrode area assigned to the gas lock should frequently exceed about 1% and be below 20%. A particularly useful value is between 5 and 15%. In certain cases it may, however, be justified to use larger gas locks, for instance with quite large electrodes, in order to reduce the design requirements on the outer vessel.

As mentioned above, hydrogen is consumed in a slow reaction with the positive electrode material, and oxygen in a faster reaction with the negative material. A proper oxy-hydrogen recombination can also take place by the catalytic effect of the electrode materials. It may sometimes be necessary to reduce the load on the electrode materials by disposing special catalysts, for instance on a noble metal basis, so as to accelerate the direct reaction between hydrogen and oxygen which is sometimes practiced with so-called sealed cells.

It may also be useful to let the system contain a certain amount of inert gas from the beginning, which could be obtained by having the gas locks filled with air to begin with, whereafter the oxygen of the air will be consumed in reaction with the negative material, with nitrogen remaining as an inert and permanent gas. The risk for under-pressure in the system is eliminated in this way and the risk for varying electrolyte distribution between the electrolyte spaces.

The connection 5 according to the invention can, in its simplest embodiment, be a hole straight through the electrode as shown on FIG. 1. A useful diameter of such a hole is between 0.3 mm and 2.0 mm. It is, however, possible to use holes with smaller dimensions down to one tenth of a millimeter or slightly below. Holes larger than 2mm. can be used in conjunction with large electrode dimensions (e.g., above 100 $cm^2$). The holes can have a different cross-section than circular section.

It is often advantageous to provide the fluid connection internally of the electrode, that is, straight through the electrode at or near the vertical line through the midpoint of the electrode in much the same way as shown in FIG. 1. The connections 5 may, however, also be arranged near the periphery of the electrode.

Alternatively the connections could be located externally as channels situated in the isolating envelope. Such channels would be in connection with the electrolyte spaces via special bichannels. These channels, or in same cases bichannels, then have to be connected to each electrolyte space, according to the basic concept of the invention, at a level which is below the highest point in the electrolyte spaces, in order that a gas lock can be formed. Disposal of the connections as a system of channels and bichannels in isolating frames which contain the electrodes—in principle according to the technique which has been developed for fuel cells, (see Swedish Pat. No. 217,054)—will increase the sectional area of the battery somewhat and thereby its volume and weight, but on the contrary this gives good possibilities to reduce the leakage currents to a very low level, since these connections can be made long with but modest increase of their area.

Part of the gas-lock can also be disposed with advantage in the fluid connection itself as shown in FIG. 2, with internal as well as external disposal of the connections. The connection is here shaped as a U-shaped channel 20 arranged in the electrode. Such internal channels may be of considerable length, which will reduce the leakage currents to a minimum.

One extreme embodiment is to dispose the connection in a separating wall 2 as exemplified in FIG. 3. The separating wall contains in this case a channel as a double spiral 21 one mouth of which 22 is connected to the one electrolyte space whereas the other mouth 23 is connected to the electrode on the level which is a characteristic feature for the invention (i.e., below the top of the electrolyte space). The length of the channel is thereby greater than the thickness of the electrode. The separating wall which also serves as a connection may simultaneously contain cooling channels for gaseous or liquid coolant fluids connected to a special cooling system. This kind of separator wall can be manufactured in many different ways. One possibility near at hand is to build up the separator wall from two elements which are press-fit together so that channels are formed between the elements when they are put together and joined for instance by welding or soldering.

It is also possible to start with planar elements and get the channel structure by means of a special element with punched, or otherwise formed, channels, which special element is sandwiched between the two first-mentioned elements. If the special element is manufactured of an electric isolating material, like neoprene rubber, one must of course provide a satisfactory electronic contact between the two first-mentioned elements by point welding or in other ways.

A particular advantage with the embodiments where the separator wall is composed of at least two elements is that the positive and the negative electrode materials can be built-up on each element before the separator wall is formed by joining the elements.

FIG. 4 shows the manner in which long channels defining a fluid connection between the electrolyte spaces, according to the invention, also can be arranged in the envelope 9. For instance they can comprise channels 24 located in the electrode frames 25 which contain the electrode 1. The channels communicate with the one electrolyte space at 26 and with the other electrolyte space at 27. A similar connection 28 is arranged preferably for electrolyte transport between the two electrolyte spaces at 29 and 30. FIG. 4 shows a symmetric design, 180° rotation gives the same configuration.

This may sometimes also be of advantage in the practical operation. By rotating 180° a symmetrical battery— in principle designed according to FIG. 4—the gas lock and the electrolyte space between 29 and 30 will change place and function. This can be utilized, for instance, for reactivation of the electrode materials in the space which in the earlier mode was used as gas lock.

The channel system in FIG. 4 can be furnished with a through-channel or manifold 31 which connects directly all connections 24 with each other and which may be connected to the vent pipe 9 shown on FIG. 1. A similar conduit can be arranged at 32 which can be joined to the connection for electrolyte filling 15 shown on FIG. 1. There exists great freedom for channel arrangements of this and similar kinds, as long as there are provided the characteristic gas locks and the communications between the gas locks in the battery pile. It is, however, always necessary to provide sufficiently high resistance in these connections so as to hold leakage currents between the electrolyte spaces to a minimum.

One advantage with a long connection, which has been discussed above and is exemplified in FIGS. 2, 3 and 4 is also that the connections—with their high volume—represent a gas accumulating capacity in addition to the capacity of the gas locks themselves. This can be of great importance in electrode systems with strong gassing tendency and/or slight reactivity towards the battery gases. The direct connection according to FIG. 1 is a simple construction and satisfactory in most cases, however.

There are also other embodiments of the direct connection which reduce the leakage currents. One such embodiment involves the use of a porous plug 32' in the channel as shown in FIG. 5. The plug 32' can be made entirely of hydrophobic material, for instance porous polytetrafluorethylene (Teflon), whereby the leakage currents are kept on a very low level while the gas transport takes place easily. Such a porous plug of Teflon or similar hydrophobic materials can be manufactured according to the state of the art by compressing (for instance at 1 ton per $cm^2$) and sintering (at 280° C. during 1 hour) a mixture of Teflon powder and pore forming materials, like sodium chloride, which is subsequently leached out.

A variation is depicted in FIG. 6 wherein a hole 33 is provided only in the separating wall itself. This hole can be made prior to the disposal of the electrode materials on the separator wall. In this case, the electrode material itself serves as a porous plug in the zones 34 and 35 (FIG. 6). These zones can be made hydrophobic, for instance by local impregnation with a 15% Teflon dispersion followed by heat treatment for sintering of the hydrophobic material.

It is particularly advantageous to arrange catalysts for hydrogen electrodes, for instance Raneynickel, noble metals, etc., in this part of the electrode or in the special plug.

FIG. 1 shows only one connection per cell. Of course, one can dispose several similar connections on the same or near the same level in the upper part of the cell as also should be evident from the description above. It is also of advantage—in a special embodiment of the invention—to arrange connections further down in the cell, which connections are mainly used for electrolyte transport between the cells, which connections also could be made hydrophobic. These connections can, with advantage, be disposed somewhat above the lowest level in the cell so as to form a sludge space. With strongly sludging electrode materials it may, however, be of advantage to arrange such connections in the lowest part of the cell in order to make possible disposal of the sludge by rinsing. With great sludging tendency these electrode parts can be protected entirely with isolating materials or eliminated in order to reduce the risk for short circuits and thief currents. Efficient separators are also available for these electrode systems, see above.

Figure 7:
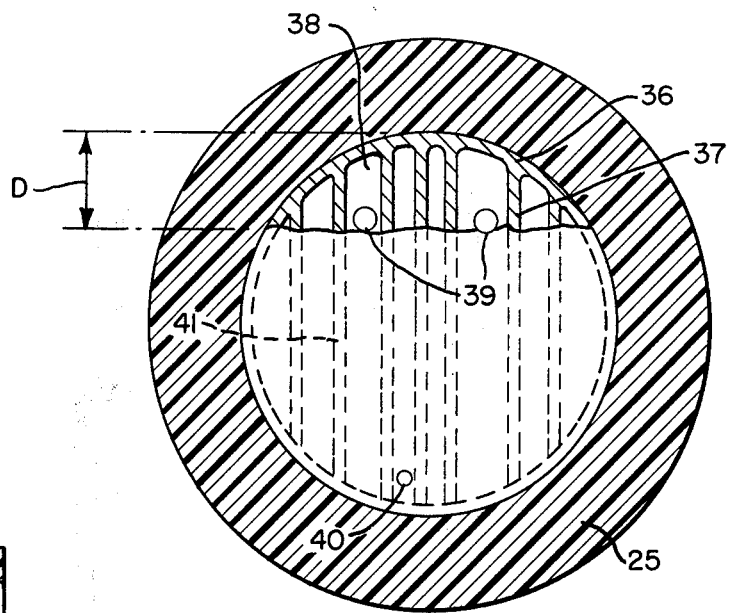
FIG. 7 is a cross-sectional view taken through an electrolyte chamber of a battery cell, depicting a modified form of the invention wherein a separator is situated in the electrolyte chamber.

The gas lock in the upper part of the electrolyte space will, in its simplest embodiment, not differ from the electrolyte chamber in the other parts of the cell. It may, however, be justified to supply this chamber with special means to increase or to assure the chemical reactivity against hydrogen and oxygen. FIG. 7 shows such a measure. The gas lock contains a microporous separator in the shape of a comb 36 having pins 37. The separator can occupy the entire electrolyte chamber, as indicated by broken lines. The separator is joined to the frame 25 by gluing, welding, or by a mechanical joint. The spaces 38 between the pins are normally filled with gas. The connections according to the invention are this case arranged at 39. A connection is also made at 40. The separator contains electrolyte whereby electrode material in contact with the separator takes part in the electrochemical reactions in the normal way. The separator, however, assures that the zones 38 of the electrode materials are filled with electrolyte, therefore also these zones take part in the electrochemical reactions with ion migration preferably in the separator. In this way the chemical activity of the electrode materials are maintained in the zones 38 for reaction with battery gas accumulating here. The pins can be shaped so as to extend along the entire electrode surface, which embodiment has been indicated by the broken lines 41 in FIG. 7.

The separator can also be shaped in different ways than shown in FIG. 7. For instance, it can have punched-in holes connected to pressed channels for gas supply to the holes.

The shortest distance between separator-covered and free surfaces of the electrode materials should not exceed the thickness of the electrode material by more than a factor of 10. A good value is between two and five times the thickness of the electrode material.

The electrode materials in the gas lock can also be modified in different ways to accelerate the chemical reactions. The reaction rate is here governed by the structure of the electrode material which influences the mass transfer and by the reactivity of the electrode material. The reactivity of the electrode material can be promoted by addition of, for instance, cadmium to an electrode material mainly containing iron. The structure can be made more porous and open in the gas lock than in other parts of the electrode, for instance by using a higher content of spacer, if the electrode material is manufactured according to the Swedish Pat. No. 360,952. A particularly useful modification of the electrode material in the gas lock is to make this completely or partially hydrophobic in known manner, for instance by impregnation with a 15% Teflon dispersion followed by heat treatment. The negative electrode material may also be impregnated with known electrocatalysts from the fuel cell technology for electrochemical hydrogen oxidation. A quantity of 1 mg Pt (Platinum)/cm$^2$ electrode area is frequently quite satisfactory for this purpose. Recombination catalysts of the state of the art may also be disposed in the connection or in special spaces connected to the gas lock and/or the connections according to the invention.

I have tried to illustrate the spirit of the invention above and I have thereby concentrated the discussion to the particularly characteristic feature of the invention. I shall in the following give a more detailed description of over-all implications of the invention. This description is disposed in two sections. In the first section I will give a detailed example of a battery, with a discussion of different variations of this particular embodiment, however, with no particularly precise specification of the electrode system. In the other section, in which the design of the battery is specified, I shall discuss various embodiments of the electrode system, in this case iron/nickel (III) hydroxide in more detail. The purpose of these two sections of the description is to make the expert more familiar with the spirit of the invention and how this can be transformed into hardware.

Battery Frame Structure

The following section of the description will build on the description of the spirit of the invention as demonstrated in FIG. 1. The envelope is here built up of frames containing the electrodes.

Figure 8:
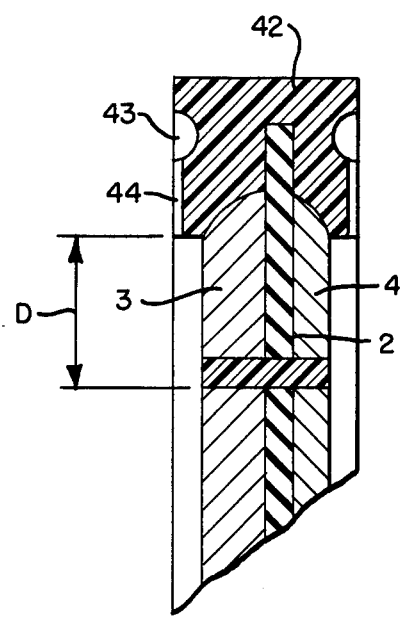
FIG. 8 is a view similar to FIG. 5 depicting a manner of mounting the electrode within the frame, and also depicting another form of gas lock.

FIG. 8 shows a cross-section through such a frame. The electrode materials 3 and 4 have been compacted at their periphery. The frame 42 which can be made of Teflon, polyethen, polypropen, penton, polysulphone, polyphenyleneoxide or other known alkaline resistent thermoplastics have been molded directly around the electrode materials, so as to make a tight bond between the electrode and the frame. It is, of course, possible to make this frame from two elements which are welded together and to the electrode material by thermal methods or by means of ultra sound. They can also be glued together to a continuous frame or joined together in other ways. It is here possible to use the known art for making fuel cells and batteries in the so-called filter press configuration, see for instance the Swedish Pat. No. 217,054 or the Swedish Pat. No. 389,011.

In this special case the frame is formed with a ring-shaped slot 43 which communicates with the electrolyte space via conduits 44 taken up in the frame 42 (only the upper conduit shows in FIG. 8). A lower part of the slot 43 can accommodate sludge which sediments downwardly through the electrolyte space, whereupon it is collected as in a trap. In the upper part of the electrolyte space the slot 43 serves as an extra gas accumulator for the gas lock.

It is frequently of advantage also to protect the edge of the electrode from short circuits by means of a thin isolating ring, for instance by impregnation or in other ways. The envelope 9 can also be cast in one piece as has been described in the Swedish Pat. Nos. 359,967 and 360,512.

Figure 9:
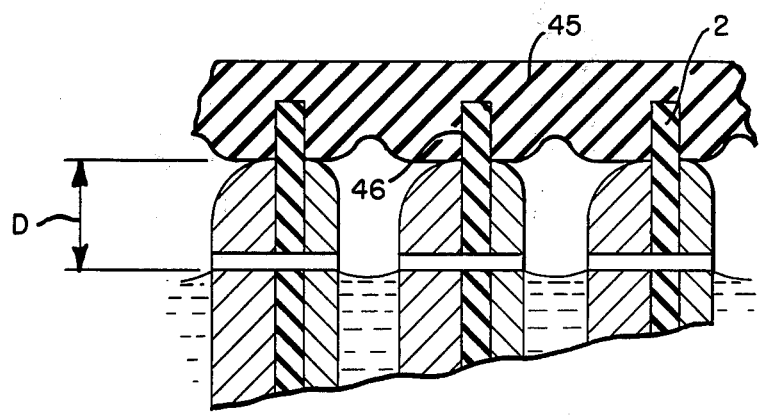
FIG. 9 is a longitudinal view of a top portion of a battery, including a plurality of battery cells, depicting a further manner of mounting battery cells.

A special variation is to use a continuous, coherent envelope manufactured by an elastic material like neopren rubber or butyl rubber as shown in FIG. 9. This envelope 45 is provided with internal recesses 46 for retaining the electrodes. The electrodes 1 are put directly in these recesses by putting the envelope over the electrodes. The envelope may possibly, at the beginning of the assembly, be in and out with respect to the recesses whereafter the envelop is rolled over the pile of electrodes plus possible separators and/or distance keeping elements which thereby are preferably held fixed. The envelope 45 can also contain channels and bichannels as noted previously in connection with solid frames FIGS. 4 and 8). The bond between the electrodes and the envelope can preferably be improved by vulcanization.

Special distance elements or separators may sometimes not be necessary. It may sometimes actually be of advantage, particularly for stationary applications with modest requirements on energy density, not to use distance elements since these may sometimes contribute to sludge collection and short circuits. In tractionary applications it is, however, frequently necessary to use distance elements in the form of for instance pins manufactured by polystyrene, pentone or similar materials. These pins can be made as a coherent structure whereby the supporting element is put directly in the electrolyte space at the assembly.

The electrodes may also be provided with ducts for the supporting pins as is frequently the case with commercial alkaline accumulators with pocket electrodes. It is, however, desirable to minimize the electrode distance since this may contribute to an important chemical back reaction of the battery gases in the lower parts of the electrolyte space. One may here use separators such as are being used in sealed or nylon base or other polymeric materials, for instance non-woven polypropylene.

Figure 10:
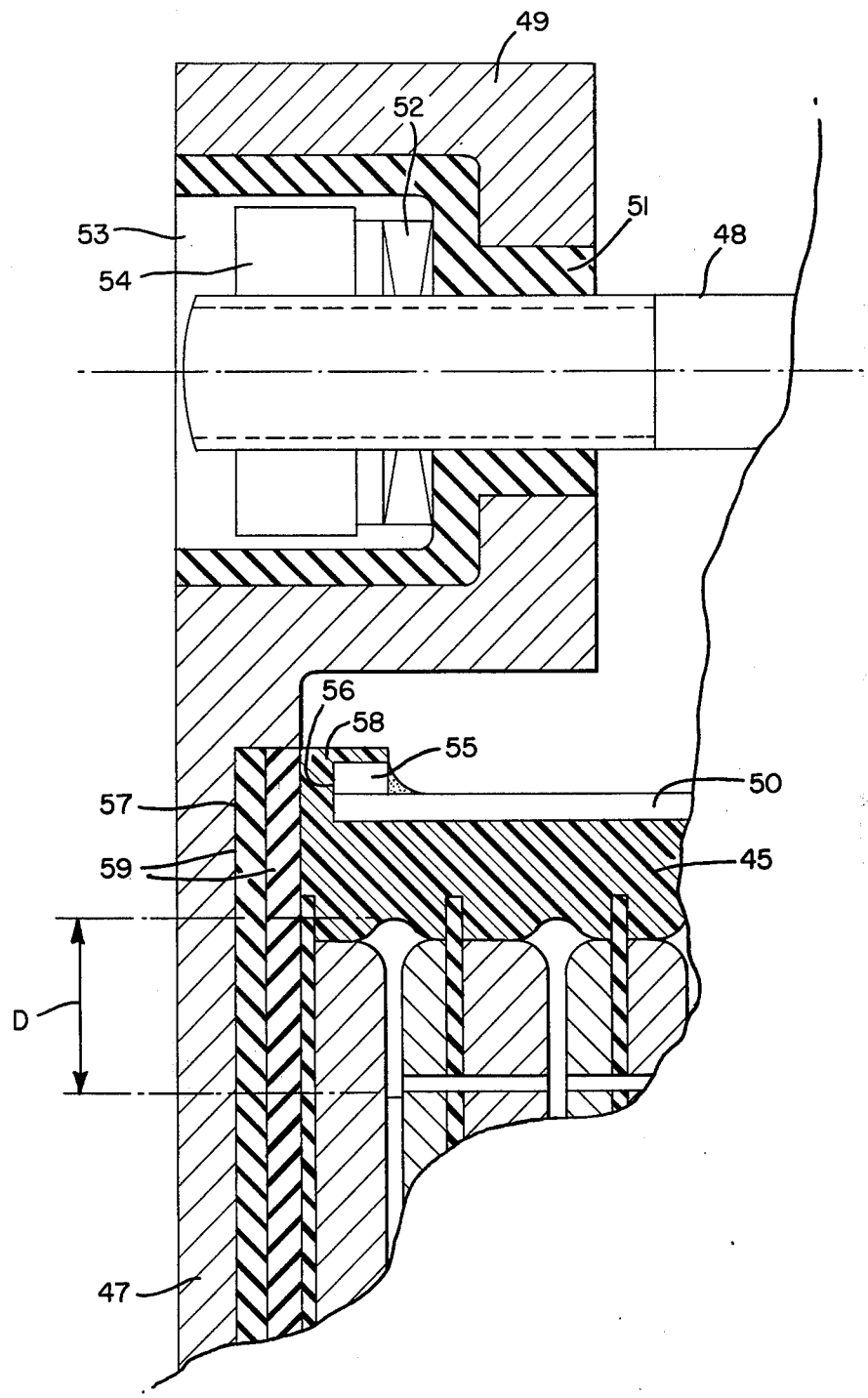
FIG. 10 is a longitudinal sectional view of an end portion of a battery depicting a flange and coupling for an outer vessel of the housing.

It is frequently of advantage but not always necessary to arrange the envelope 9 with its battery pile in an outer vessel 14. The envelope can be manufactured by casting, for instance, of a curable epoxy resin; the envelope can be made sufficiently strong against the inner gas pressure by means of an armament of, for instance, glass fiber cloth. The outer vessel 14, in principle according to FIG. 1, can be made as a flanged steel cylinder. The flanges can have, for instance, a square section with a side somewhat exceeding the outer diameter of the steel cylinder. FIG. 10 shows a cross-section through a part of the flange. The flange 47 is drawn with four bolts 48 in the four fortified corners 49 which bolts are arranged outside the steel cylinder 50 and electrically insulated from the flanges by insulative mounting disks 51. Feather disks 52 are also arranged in the duct 53 for the bolt which is drawn with a nut 54. The steel cylinder 50 is fortified with a welded ring 55 and is machined at its end to form a sealing surface 56. A similar sealing surface 57 is arranged on the flange. For simplicity the envelope 45 is in this example made as a coherent blanket according to FIG. 9, with a collar 58 in its both ends. A corresponding gasket 59 is arranged against the flange. In this example the battery pile is thus completely isolated from the cylinder by the blanket 45 and the gasket 59. It is, of course, possible to use O-rings or other efficient gaskets, instead of the plain gasket shown in FIG. 10 for simplicity. The pole bolts and other components, for instance connections for electrolyte supply and vent, are arranged in an insulating and sealing manner analogous to what has been shown for the bolt 48 in the same FIG. 10. It may, however, also be an advantage to arrange such connections through the steel cylinder according to the arrangement in FIG. 1.

The end electrodes are in such cases equipped with pole conductors which are carried through in ducts taken up in the two ends of the steel cylinder whereby insulation is obtained by isolating and sealing means, for instance made of butyl rubber. Great attention must be paid to electrical insulation depending on the frequently very high potential difference between the two ends of the pile.

In the example according to FIG. 10 there is only one barrier between the steel cylinder and the voltage-carrying parts of the pile. It may frequently be desired to increase safety by having several independent barriers. The inside of the steel cylinder may thus be covered by an isolating resin, for instance an epoxy resin; the next barrier can be a continuous rubber blanket, possibly in the form of two independent parts, one on top of the other. If the pile is built up of plastic frames there will be another barrier, particularly if the plastic frames have been joined in a sealing manner, for instance by gluing, ultra-sonic welding, casting in one piece, etc. This also applies to the end elements which could be protected by an epoxy resin and two independent barriers. The connections through the vessel require special attention from the point of view of insulation, and it is also desired to make these parts of the vessel stronger by means of extra fortification. Designs for insulating through-connections are well-known within the battery technology.

It is also desired to protect the outer surface of the vessel, for instance with an epoxy lacquer. This external treatment also reduces the risk for external short circuits and prevents atmospheric corrosion.

A certain amount of pressure can build up in the pile when gas development takes place. The recombination capacity of the battery can temporarily be smaller than the gas development, for instance, during strong overcharge. If the internal pressure is above the design pressure for the outer vessel, this pressure must be reduced. This can take place by means of safety valves which open at a pre-set pressure. If for some reason these valves should not operate, the vessel is, however, so designed that the feather disks at the bolts will open so that gas can escape at the flanges. The bolts are also dimensioned so that they will break first so as to set the flanges free in case the safety measures should fail.

ELECTRODE STRUCTURE

There are many specific electrode embodiments of the invention. The invention shall now be exemplified further with a more detailed description of one of these specific embodiments. In order to simplify the description I have chosen a nickel/iron battery in a configuration which is related to the design which was chosen for the illustration of the spirit of the invention in the above description.

This battery is built up by means of the following components: 40 bipolar electrodes in plastic frames in principle according to FIG. 8, one positive end electrode with pole connection, one negative end electrode with pole connection, 41 cell room supports, one steel cylinder with connections for pole connections and connections for electrolyte filling, gas vent and safety valves, etc., two flanges with four bolts, one isolating envelope consisting of a blanket and flange protections and gaskets for the connections.

The electrodes are circular with a diameter of 220 mm for the active electrode surface and an outer diameter for the plastic frame of the electrode element of 235 mm. The inner diameter of the steel cylinder is 240 mm to make room for the rubber blanket. The thickness of the steel cylinder is 2mm. The flange has a rounded square section with the four bolts in each corner outside the steel cylinder. In order to reduce the volume requirement of the battery pile the flange sticks out only 2 mm outside the outer of the steel cylinder in the middle section of the flange. Therefore, the effective diameter with cubic packing of the modules is 248mm, say 250 mm. Each electrode element has a thickness of 9 mm counted at the frame and 8.2 mm counted over the active area of the electrode. The thickness of the electrolyte space is 0.8 mm. The two end electrodes have a combined thickness of 10 mm. The two flange protections which are located between the end elements and the flange has each a thickness of 5 mm. and are made of several layers of butyl rubber. The flange has a thickness of 5 mm. and is fabricated, like the cylinder, of pressure vessel steel which is protected on it interior and outer surfaces with an alkali-resistant protective lacquer applied by powder sintering. The length of the module is 390 mm, say 400 mm considering the tolerances. The electrode area is 380 cm². The number of voltage steps is 41, which gives an average module of 50 volt at a cell voltage of 1.22 volt. The volume of the module is 20 dm³, or effectively 25 dm³ when the modules are stacked in a cubical lattice. That portion of the cell room which is normally gas filled shields 5% of the electrode surface. In the estimate of normal capacity, starting with the capacity density of the electrode materials, there is deducted the gas lock which gives a margin. The capacity for the pile is thus counted on 342 cm² normal electrode area. As electrolyte 20% potassium hydroxide is used containing an additive of 10 grs. lithium hydroxide per liter. The capacity of the module depends to a large extent on the structure of the active electrode material. There are several different alternatives here. The positive and negative electrodes could thus be made as so-called pocket electrodes of the kind which are now in commercial use. The cell pitch could then be disposed on 0.8 mm electrolyte space, 0.4 mm separating wall, 5.2 mm positive electrode and 2.6 mm negative electrode, altogether 9 mm. In this case the two electrodes are point-welded to the separating wall which could be made of nickel, iron, or be a nickelcoated iron plate. It is also possible to build up the pocket electrodes directly on the separator wall which then will serve as one of the walls in each electrode part. The electrodes are in all other respects built according to the state of the art.

Instead of pocket electrodes one might also use impregnated sintered plates of the kind which is used with so called sinter cells, which are described on pages 111–154 of the aforementioned Falk and Salkind book. In this case impregnation of the sinter for the negative electrode will take place with galvanic precipitation from an iron salt solution in analogy with the procedure used for fabrication of the corresponding cadmium electrodes. These impregantion procedures are, however, quite time-consuming. A good route is, therefore, first to produce the matrix by pressing and sintering of a sandwich containing the support material for the negative electrode which could be carbonyl-nickel in a known way with addition of spacer for instance according to the Swedish Pat. No. 360,952, whereby the separator wall is preferably activated by etching or in other ways to give a good bond. The sinter for the active electrode material can be built up in an analogous way, but in this case with a double thickness. The green (unsintered) object is then sintered for instance in hydrogen at 790° C. for 1 hour, whereafter the spacer is leached out and there will remain then a matrix which is to be impregnated on each side with electrode material with known methods. This impregnation can be carried out in one single operation. The electrode is first framed in a frame with gluing, casting or welding according to the methods, which have been developed for iron-air batteries and fuel cells, whereafter the electrode is put in an impregnation vessel in an auxiliary wall which fits to the frame. Two cell rooms are then produced which contain the starting materials for the iron and the nickel electrode and electrolyte for the precipitation. The impregnation is then carried out on the two sides independently of each other in the known way. The electrodes must of course then be provided with connections according to the invention. These connections can be made by drilling straight through the electrode, whereafter the holes are plugged with a porous teflon plug as has been described above.

The advantages of the bipolar electrode will be fully utilized only with very active electrode structures characterized by high porosity and good transport properties. Here it is natural to have the separator wall serve for the mechanical function and build up the electrode structure from this separator wall. In this way it is possible to reduce the mechanical requirements on the electrode material proper which gives a possibility to increase the porosity and the material utilization.

It is also desired to reduce the number of manufacturing operations, particularly the wet steps. A lot is to be gained, therefore, if it is possible to limit impregnation to only one electrode side. In this case one could shield off the side which should not be impregnated. The Swedish Pat. No. 360,952 describes a rational procedure for the manufacture of iron electrodes which are capable of quite high capacity densities. This is a good method to manufacture the iron side of the electrode element. The powder mixture used for the iron electrode is then first put into the tool, the amount corresponding to a thickness of a 2.6 mm quite according to the example in the Swedish patent. On top of this layer is placed a plate of soft iron with a thickness of 0.4 mm which has been cleaned and activated by blasting or other means so as to provide the conditions for a good bond between the separator wall and the electrode materials. Thereafter raw materials for the sinter of the positive material is filled in the mold. This could be carbonyl nickel or some other kind of nickel powder for sinter electrodes with an effective thickness of 5.2 mm. After pressing, sintering, leaching and drying the positive side is impregnated in known ways whereby the iron side of the electrode is protected for instance by means of a strippable paint. The nickel sinter which is 5.2 mm thick should have a high and uniform porosity.

Nickel represents an important material cost in this system which otherwise is using cheap materials. It may therefore be of advantage to use nickel only for the active material in applications which are particularly sensitive to price and use an iron skeleton for the support of the positive electrode material. One could the proceed as has been described above but replace the raw material for the nickel matrix with nickel-coated steel wool or steel fibers. The matrix is then impregnated according to the procedure which has been described in the Swedish Pat. No. 360,220.

It is thus not necessary to build up the supporting part of the electrode material from metal powders. One might as well use wires or fibers of iron alternatively nickel or other metals, for instance as has been described in the U.S. Pat. No. 3,127,668.

The new electrode types, which have been mentioned in this last paragraph, have in common much higher capacity density than the pocket electrodes or sinter electrodes used before. In tractionary applications, which are particularly suited for batteries according to the invention, there are strong demands for high power and energy density and it is therefore particularly useful to utilize these newer types of electrode materials for batteries according to the invention. We may then count with a capacity density of 0.3 Ah/cm³ for the positive material which gives a capacity of 53.5 Ah, say 50 Ah, for the pile described above, which gives a margin for product variations. The negative electrode has in this case a capacity density of 0.7 Ah/cm$^3$ and therefore the positive material is limiting in this system. The energy content is thus 2.5 kWh which corresponds to 50 kWh/kg alternatively 100 kWh/m$^3$ trayed volume.

I have chosen the nickel/iron system in this example and not the nickel/cadmium system so as to be able to discuss the gas recombination in a comprehensive way. Hydrogen evolution is of course the difficult problem with these sealed systems since the positive electrode material reacts but slowly with hydrogen. Cadmium anodes gives off only small quantities of hydrogen when the anode material is present in excess. Sealed nickel/cadmium cells have therefore proved to be capable to a comparatively problem free operation and have gained wide acceptance. On the other hand, iron is a very attractive anode material and seems to be the only material which can satisfy all the requirements which have been mentioned above in a completely satisfactory manner.

Iron is, however, at least from a historical point of view known as a very tricky material and is characterized among other things by self-discharge with hydrogen evolution and a tendency to passivation, which can lead to cell reversal and thereby also to excessive gas development in individual electrolyte spaces. There are some possibilities to reduce these negative effects, for instance by addition of sulphides, mercury, etc. It is, of course, highly desirable that sealed batteries according to the invention containing iron anodes make use of these methods known to the expert. Hydrogen might nevertheless be developed for instance by self-discharge with no associated oxygen production. The pressure will then rise in the battery pile whereby hydrogen is distributed evenly between the different electrolyte spaces thanks to the connections.

It is a characteristic feature for the nickel/iron batteries according to the invention that they are contained in pressure vessels which can take comparatively high pressures of the order of 0.5 – 1 mpa or in certain designs much higher pressures up to 10 mpa or above this. Increased pressure will increase the rate of reaction between the hydrogen and the positive electrode material at the same time as hydrogen development at the negative electrode material is reduced. Furthermore, there will be a electrochemical oxidation of hydrogen at the negative electrode material particularly in the gas lock. Thanks to the connection between the electrolyte spaces the leakage currents can maintain the electrochemical hydrogen oxidation which of course is coupled to a corresponding normal discharge of the positive electrode material. Design of the connections for systems with high hydrogen evolution is then governed by the requirement that it will be able to take the ion current which is necessary for the desired electrochemical hydrogen oxidation. In such cases the above indicated design rules are put out of play. These rules serve to minimize leakage currents without risking the function of the connection as such. An alternative, however, is to use an outer load which takes a current which corresponds to hydrogen evolution during discharge. This load could be another battery which is being charged in this way. This fuel cell mechanism could be magnified in different ways as has been described above. A suitable method is for instance to make the porous plug to be a porous gas diffusion electrode for hydrogen. This could then be a sintered nickel structure in principle with the same structure as the sinter for the positive material which structure is platinized and hydrophobized in known manner. A special advantage with this embodiment is that it will assure a good contact with hydrogen which will be transported back and forth through the plug depending on the differences in gas evolution and rate of oxidation.

With larger demands for capacity for hydrogen oxidation of the anode material larger parts of the electrode material particularly in the gas lock should be made electrocatalytically active by means of electrocatalysts and hydrophobic treatment of these parts. Useful electrocatalysts are Raney-nickel, nickelboride and active carbon which do not pose problems in the case of eventual recovery of the metal values of the battery. One should assure that a sufficient excess of negative anode material is available in the system, particularly in the gas lock, for reaction with oxygen developed during charging in these modifications. These electrocatalysts also serve simultaneously as recombination catalysts for the reaction between hydrogen and oxygen.

It is of course also necessary that the battery system is designed for sufficient reliability as regards means for venting at excess over-pressure which could be accomplished by double safety-valves, etc. It may sometimes be a fairly normal operation to vent the system via the safety-valve, for instance during intensive charge, alternatively that the safety-valves intermittently have to reduce pressure due to hydrogen developed during long periods of stand-by because hydrogen for some reason does not become oxidized. In such cases the battery cannot be called a completely maintenance-free battery, since water must be added for compensation of the losses. It is an economic question to balance costs and trouble with this service and maintenance against loss of performance with the alternative to increase the gas accumulating capacity in the gas locks and to increase the capacity for hydrogen oxidation. It is, however, not difficult for the expert to carry out this optimization for the nickel/iron battery for each individual case depending on economic requirements and other pertinent circumstances.

The description above has been particularly devoted to the nickel/iron system. The invention can be equally as well applied for other alkaline electrode systems like the combinations cadmium-nickel hydroxide, zinc-nickel hydroxide, zinc-silver oxide, cadmium-silver oxide, iron-silver oxide, etc. It is no difficulty for the expert to modify the embodiments described above for these various electrode materials using generally available knowledge about alkaline battery technology as it is described in the book by Falk and Salkind referred to above. Systems containing zinc thereby require special attention depending on the known shape changes with the zinc electrode, dendrite growth, etc. One may thereby utilize known methods which are practiced to eliminate these disturbances, for instance minimization of electrolyte, addition of calcium hydroxide to the negative electrode material, efficient so called inorganic separators or catalytically active screens arranged in the cell room which cannot be transversed by the zinc dendrites. Silver/zinc instead of nickel/iron in the above example gives batteries with very high energy density, useful for special applications.

Nickel hydroxide is a useful positive electrode material for most of these applications. We have, however, mentioned that silver oxide can be used in applications with high requirements on energy density where price sensitivity is low. There are also applications where the requirement on a low price is a deciding factor as well as requirement on high energy commercial efficiency, whereas the requirement on energy density is less pronounced. Such an application is peak shaving batteries for power grates. In these cases one may use as negative material iron and as positive material ferric hydroxide corresponding to the so-called second discharge step. Such systems may be stabilized in known manner with sulphide and other additions. Another useful combination is iron and lead dioxide.

The invention is also not restricted only to batteries with alkaline electrolyte, it may also be applied for acid systems like the lead dioxide, sulphuric acid system, whereby special requirements are put on the separator wall which can be made in titanium or be a plastic wall traversed by lead pins. It is also necessary in this case to enhance the gas eliminating action by means of recombination catalysts depending on the fairly weak chemical recombination with the electrode materials which today are being used in tractionary lead acid batteries.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. In a chemoelectric battery comprising a plurality of bipolar electrodes; each electrode including an electrically conductive separating wall which is impermeable to electrolyte, negative electrode material disposed on one side of said separating wall, and positive electrode material disposed on the other side of said separating wall, said electrodes being separated by an electrolyte-containing chamber, the improvement wherein each electrolyte chamber includes a gas lock, with the gas locks being fluidly interconnected by means of fluid conduits, said conduits communicating with said gas locks at a level disposed below the top of the electrolyte chamber.

2. A battery according to claim 1 wherein said conduits extend through said separating wall and said positive and negative electrode materials.

3. A battery according to claim 2 wherein each conduit contains a gas-porous plug of hydrophobic material.

4. A battery according to claim 1 wherein the conduit-defining portions of said positive and negative electrode materials are impregnated with hydrophobic material defining a gas-porous plug.

5. A battery according to claim 1 wherein said battery includes a frame encompassing each electrode, said conduits being formed in said frame.

6. A battery according to claim 1 wherein each conduit is in the form of a spiral formed in the separating wall so as to have a greater length than the thickness of said electrode.

7. A battery according to claim 1 wherein said electrode materials in the bipolar electrode are formed of iron and nickel (III) hydroxide.

8. A battery according to claim 1 wherein said electrode materials in the bipolar electrode are formed of cadmium and nickel (III) hydroxide.

9. A battery according to claim 1 including an envelope enclosing said electrodes, and a pressure vessel enclosing said envelope; a plurality of pole bolts connected to said electrodes and projecting through said envelope and said vessel; and isolation mounting means being provided for mounting said pole bolts and insulating said bolts from said vessel.

10. A battery according to claim 1 wherein said electrode materials comprise iron having cadmium added and nickel (III) hydroxide.

11. A battery according to claim 1 wherein said electrode materials comprise iron and silver oxide.

12. A battery according to claim 1 wherein said electrode materials comprise cadmium and nickel (III) hydroxide.

13. A battery according to claim 1 wherein said electrode materials comprise iron and iron (III) hydroxide.

14. A battery according to claim 1 wherein said electrode materials comprise iron and lead dioxide.

15. A battery according to claim 1 wherein said electrode materials comprise gas eliminating substances.

16. A method for eliminating gas generated in a battery having a plurality of bipolar electrodes and electrolyte chambers therebetween comprising the steps of admitting such gases into a gas lock located at the top of each electrolyte chamber, and conducting such gases from one gas lock to another, so that gas generated in one gas lock can be distributed to a plurality of other gas locks.

17. A method according to claim 16 wherein said admitting step includes bringing said gases into contact with a gas eliminating substance communicating with said gas lock.

18. A method according to claim 17 wherein said gas eliminating substance comprises said electrode materials.

* * * * *